US012811353B2

(12) United States Patent
Moler et al.

(10) Patent No.: US 12,811,353 B2
(45) Date of Patent: Nov. 24, 2026

(54) ABOVE SURFACE POWER DISTRIBUTION ASSEMBLY

(71) Applicant: Hubbell Incorporated, Shelton, CT (US)

(72) Inventors: Gregory Lee Moler, Woodbridge, CT (US); Jian Hua Li, Bayside, NY (US); Kevin S. Lewellyn, Clinton, CT (US); Joseph Nicholas Cretella, Ansonia, CT (US)

(73) Assignee: Hubbell Incorporated, Shelton, CT (US)

( * ) Notice: Subject to any disclaimer, the term of this patent is extended or adjusted under 35 U.S.C. 154(b) by 359 days.

(21) Appl. No.: 18/565,899

(22) PCT Filed: Jun. 3, 2022

(86) PCT No.: PCT/US2022/032148
§ 371 (c)(1),
(2) Date: Nov. 30, 2023

(87) PCT Pub. No.: WO2022/256644
PCT Pub. Date: Dec. 8, 2022

(65) Prior Publication Data

US 2024/0266791 A1 Aug. 8, 2024

Related U.S. Application Data

(60) Provisional application No. 63/197,035, filed on Jun. 4, 2021.

(51) Int. Cl.
*H01R 25/00* (2006.01)
*H01R 13/447* (2006.01)

(52) U.S. Cl.
CPC ......... *H01R 25/006* (2013.01); *H01R 13/447* (2013.01)

(58) Field of Classification Search
CPC ...... H01R 25/006; H01R 13/447; H02G 3/14; H02G 3/185; H02G 3/0493
See application file for complete search history.

(56) References Cited

U.S. PATENT DOCUMENTS 3,646,244 A * 2/1972 Cole ...................... H02G 3/185 220/3.7
4,511,198 A * 4/1985 Mitchell ................ H02G 3/185 439/131

(Continued)

FOREIGN PATENT DOCUMENTS

CN 104409907 3/2015
CN 112265461 1/2021

(Continued)

OTHER PUBLICATIONS

European Patent Office Communication for Application No. 22816928.0 dated Jul. 31, 2025 (1 page).

(Continued)

*Primary Examiner* — Truc T Nguyen
(74) *Attorney, Agent, or Firm* — Michael Best & Friedrich LLP

(57) ABSTRACT

An above surface power distribution assembly includes a housing including a first housing portion supported by a support surface and a second housing portion movably coupled to the first housing portion. The second housing portion is movable relative to the first housing portion between a non-use position in which the second housing portion is secured relative to the first housing portion, and a use position in which the second housing portion is unsecured relative to the first housing portion. The power distribution assembly further includes a power distribution unit positioned within the housing, the power distribution unit including at least one power outlet in electrical communication with a power source. When the second housing (Continued)

portion is in the non-use position, the at least one power outlet is inaccessible, and when the second housing portion is in the use-position, the at least one powder outlet is accessible.

19 Claims, 11 Drawing Sheets

(56) References Cited

U.S. PATENT DOCUMENTS

| | | | | |
|---|---|---|---|---|
| 5,023,396 | A * | 6/1991 | Bartee | H02G 3/185 439/131 |
| 5,067,907 | A * | 11/1991 | Shotey | H01R 13/447 174/67 |
| 6,234,812 | B1 * | 5/2001 | Ivers | H01R 25/006 439/378 |
| 6,372,987 | B1 * | 4/2002 | Ha | H02G 3/14 174/67 |
| 6,863,251 | B1 | 3/2005 | Gretz | |
| 7,361,832 | B2 | 4/2008 | Dively | |
| 7,399,200 | B1 * | 7/2008 | Eliseo | H01R 13/72 439/577 |
| 7,605,330 | B1 * | 10/2009 | Black | H02G 3/185 174/53 |
| 7,626,120 | B1 | 12/2009 | Golden et al. | |
| 10,276,319 | B1 * | 4/2019 | Birdsong | H02G 3/14 |
| 2002/0096351 | A1 * | 7/2002 | English | H02G 3/14 174/67 |
| 2002/0195324 | A1 * | 12/2002 | Lee | H01R 25/003 200/51.03 |
| 2014/0104805 | A1 | 4/2014 | Row et al. | |
| 2014/0127948 | A1 * | 5/2014 | Beldock | H01R 25/006 439/652 |
| 2014/0370732 | A1 * | 12/2014 | Curtis | H01R 24/28 439/142 |
| 2017/0025852 | A1 | 1/2017 | Fleisig | |
| 2017/0264059 | A1 | 9/2017 | Cote | |
| 2019/0334324 | A1 * | 10/2019 | Rogers | E05C 3/14 |

FOREIGN PATENT DOCUMENTS

| | | |
|---|---|---|
| DE | 102017119476 | 2/2019 |
| GB | 2468376 | 9/2010 |

OTHER PUBLICATIONS

European Patent Application No. 22816928.0 Extended European search report dated Jul. 14, 2025.

Bigclivedotcom: "British weatherproof socket with clever design. (bonus rant)," Jan. 30, 2019 (Jan. 30, 2019), XP093288036, Retrieved from the Internet: URL:https://www.youtube.com/watch?v=IqOzWu nmKdE.

Legrand: "Soliroc," Mar. 11, 2013 (Mar. 11, 2013), pp. 1-2, XP093288076, Retrieved from the Internet: URL:https://www.confort-electrique.fr/pris e-courant-avec-volet-verrouille-legrand-so liroc-p-7461.html.

Search Report and Written Opinion issued in PCT Patent Application No. PCT/US2022/032148, dated Sep. 22, 2022.

European Patent Application No. 22816928.0 supplementary European search report dated Mar. 11, 2025.

* cited by examiner

ABOVE SURFACE POWER DISTRIBUTION ASSEMBLY

CROSS-REFERENCE TO RELATED APPLICATIONS

This application claims priority to U.S. Provisional Patent Application No. 63/197,035, filed Jun. 4, 2021, the entire contents of which is incorporated by reference herein.

FIELD

Embodiments relate to an above surface power distribution assembly for indoor and outdoor use that selectively permits access to one or more power outlets.

SUMMARY

In one embodiment, an above surface power distribution assembly includes a housing including a first housing portion supported by a support surface and a second housing portion movably coupled to the first housing portion. The second housing portion is movable relative to the first housing portion between a non-use position in which the second housing portion is secured relative to the first housing portion, and a use position in which the second housing portion is unsecured relative to the first housing portion. The power distribution assembly further includes a power distribution unit positioned within the housing, the power distribution unit including at least one power outlet in electrical communication with a power source. When the second housing portion is in the non-use position, the at least one power outlet is inaccessible, and when the second housing portion is in the use-position, the at least one power outlet is accessible.

In some embodiments, the second housing portion is biased by a biasing member into the use position.

In another embodiment, an above surface power distribution assembly for indoors or outdoors usage includes a housing that has a first housing portion supported by a support surface and that has a movable door, and a second housing portion movably coupled to the first housing portion by the movable door. The second housing portion is movable relative to the first housing portion between a non-use position in which the second housing portion is secured relative to the first housing portion, and a use position in which the second housing portion is unsecured relative to the first housing portion. A power distribution unit is positioned within the housing and includes at least one power outlet in electrical communication with a power source. When the second housing portion is in the non-use position, the at least one power outlet is inaccessible. When the second housing portion is in the use position, the at least one power outlet is accessible. The movable door protects the power distribution unit against ingress of solid debris and fluid. In some embodiments, the second housing portion is biased by a biasing member into the use position.

In another embodiment, an above surface power distribution assembly includes a housing including a first housing portion supported by a support surface and a second housing portion movably coupled to the first housing portion. The second housing portion is movable relative to the first housing portion between a non-use position in which the second housing portion is secured relative to the first housing portion, and a use position in which the second housing portion is unsecured relative to the first housing portion. The power distribution assembly further includes a door coupled to the first housing portion and selectively coupled to the second housing portion. The door is movable between an engaged position in which the door engages the second housing portion and a disengaged position in which the door is disengaged from the second housing portion. A power distribution unit is positioned within the housing, the power distribution unit including at least one power outlet in electrical communication with a power source. When the door is in the engaged position, the second housing portion is in the non-use position and the at least one power outlet is inaccessible, and when the door is in the disengaged positioned, the second housing portion is in the use position and the at least one power outlet is accessible.

In some embodiments, the second housing portion is biased by a biasing member into the use position when a user moves the door from the engaged to the disengaged position.

In some embodiments, a lock prevents the door from being movable to the disengaged position.

Other aspects of embodiments detailed below will become apparent by consideration of the detailed description and accompanying drawings.

DETAILED DESCRIPTION

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

Figure 1A:
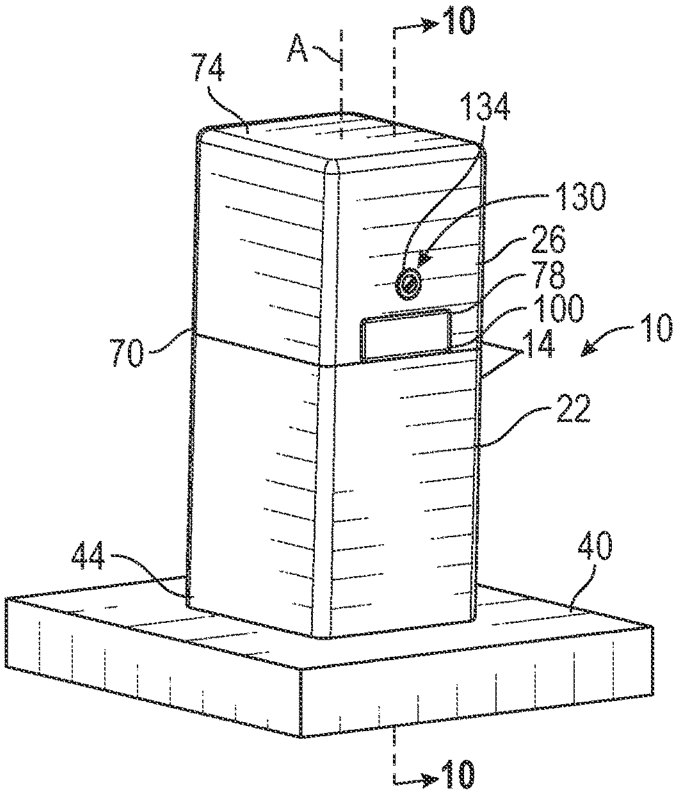
FIG. 1A is a perspective view of an above surface power distribution assembly according to one embodiment including a housing having a first housing portion, a second housing portion, a door, and a lock, the second housing portion being in a first position.
Figure 1B:
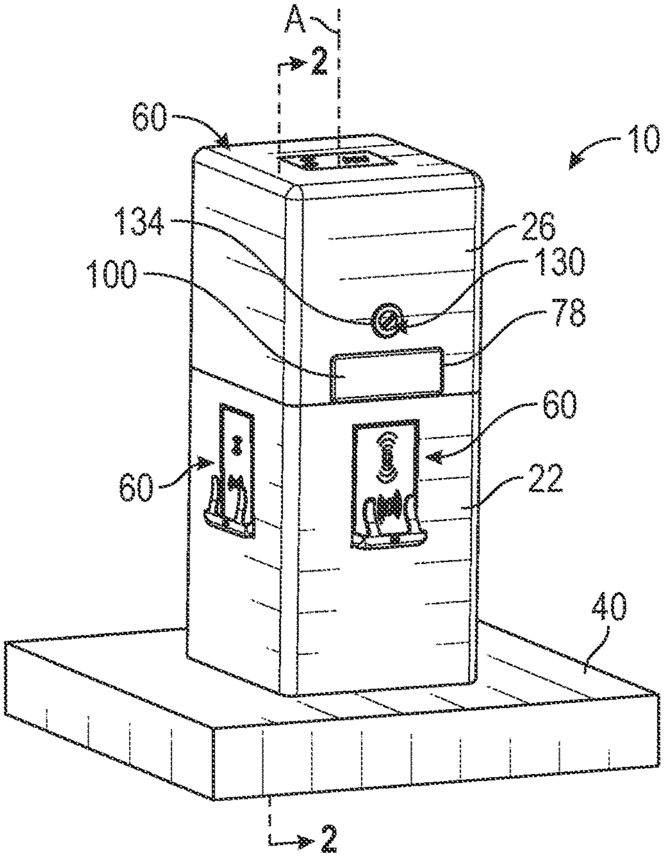
FIG. 1B is a perspective view of an above surface power distribution assembly according to another embodiment including a housing having a first housing portion, a second housing portion, a door, and a lock, the second housing portion being in a first position.
Figure 2:
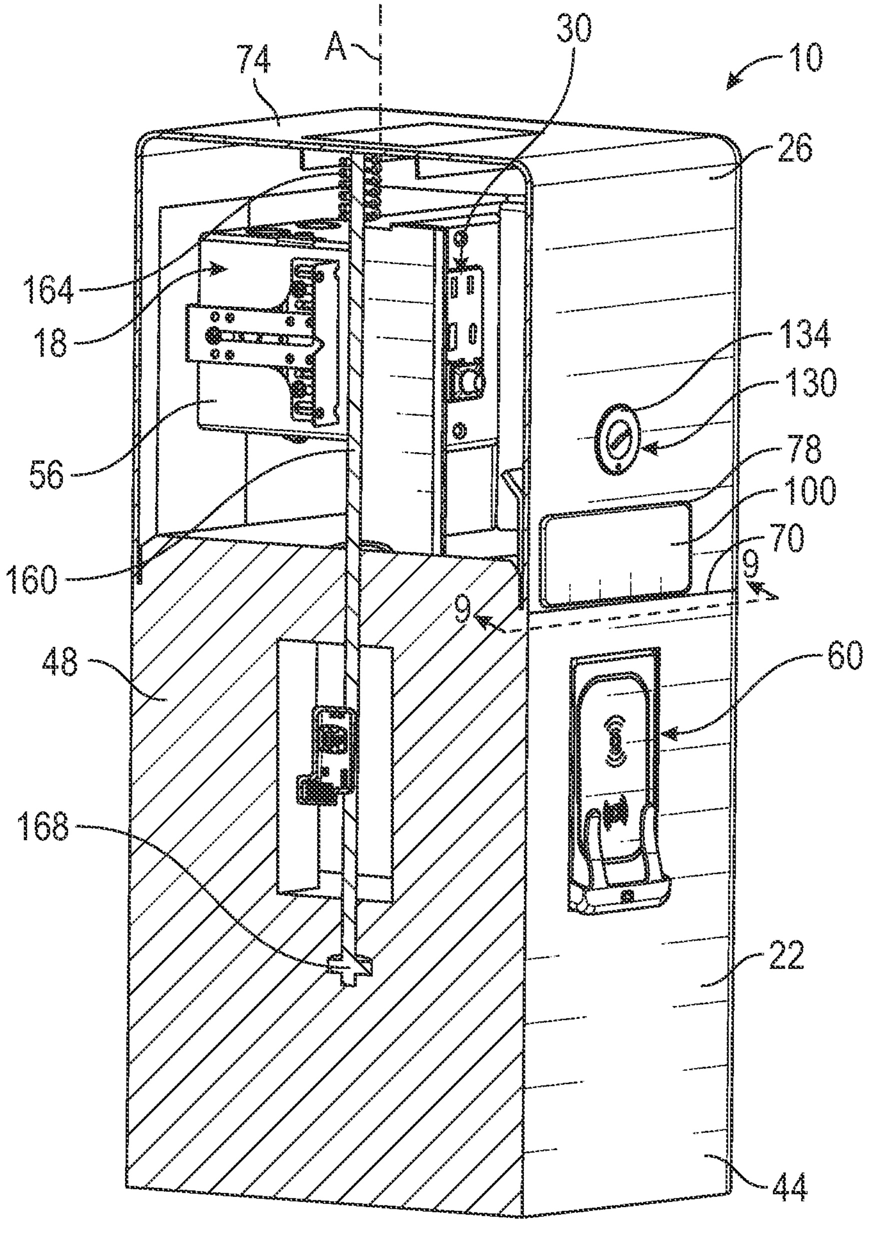
FIG. 2 is a cross-sectional view of a portion of the above surface power distribution assembly of FIG. 1B along line 2-2 of FIG. 1B.
Figure 3:
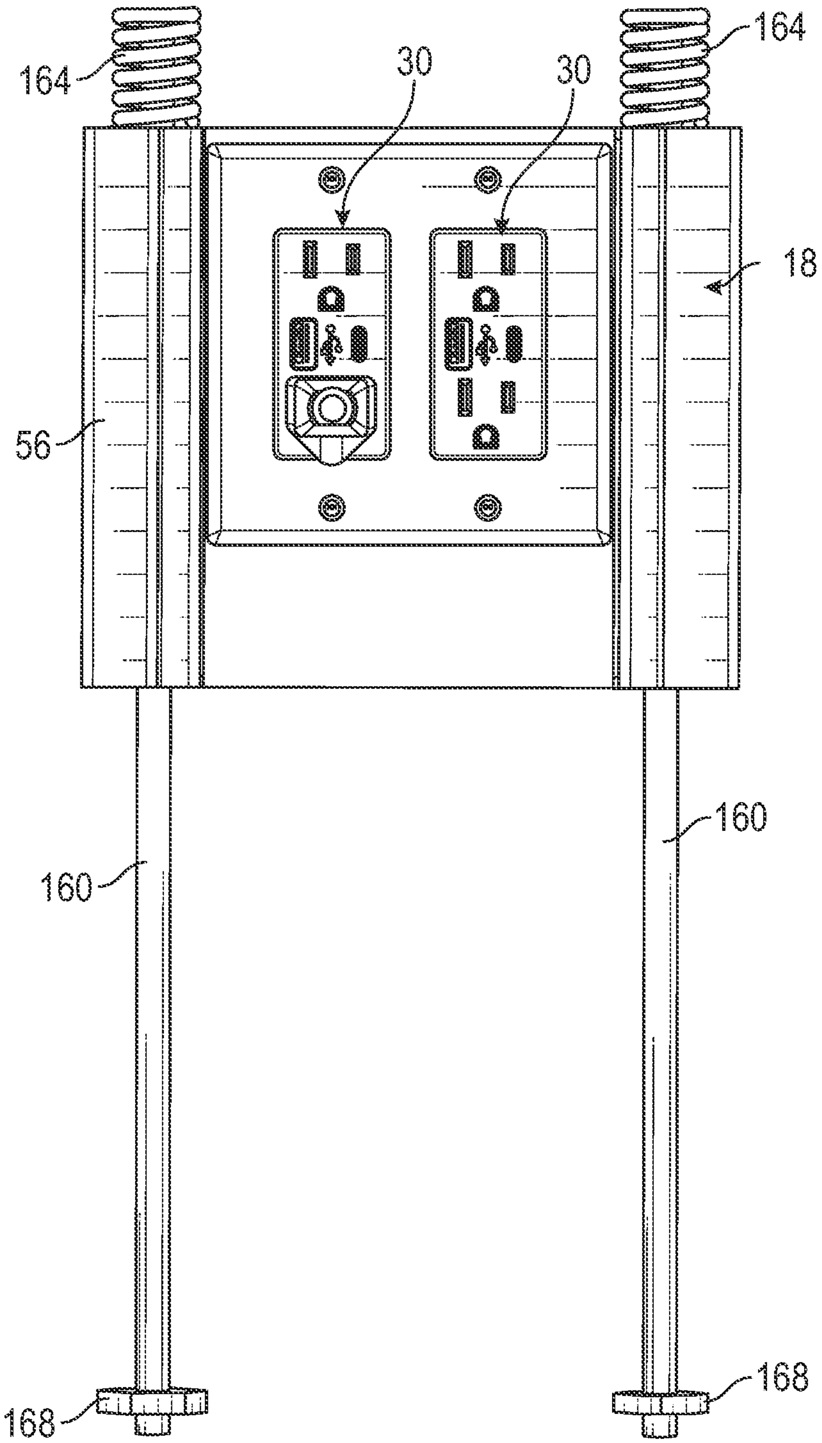
FIG. 3 is front view of the above surface power distribution assembly of FIGS. 1A and 1B with the housing removed.
Figure 4:
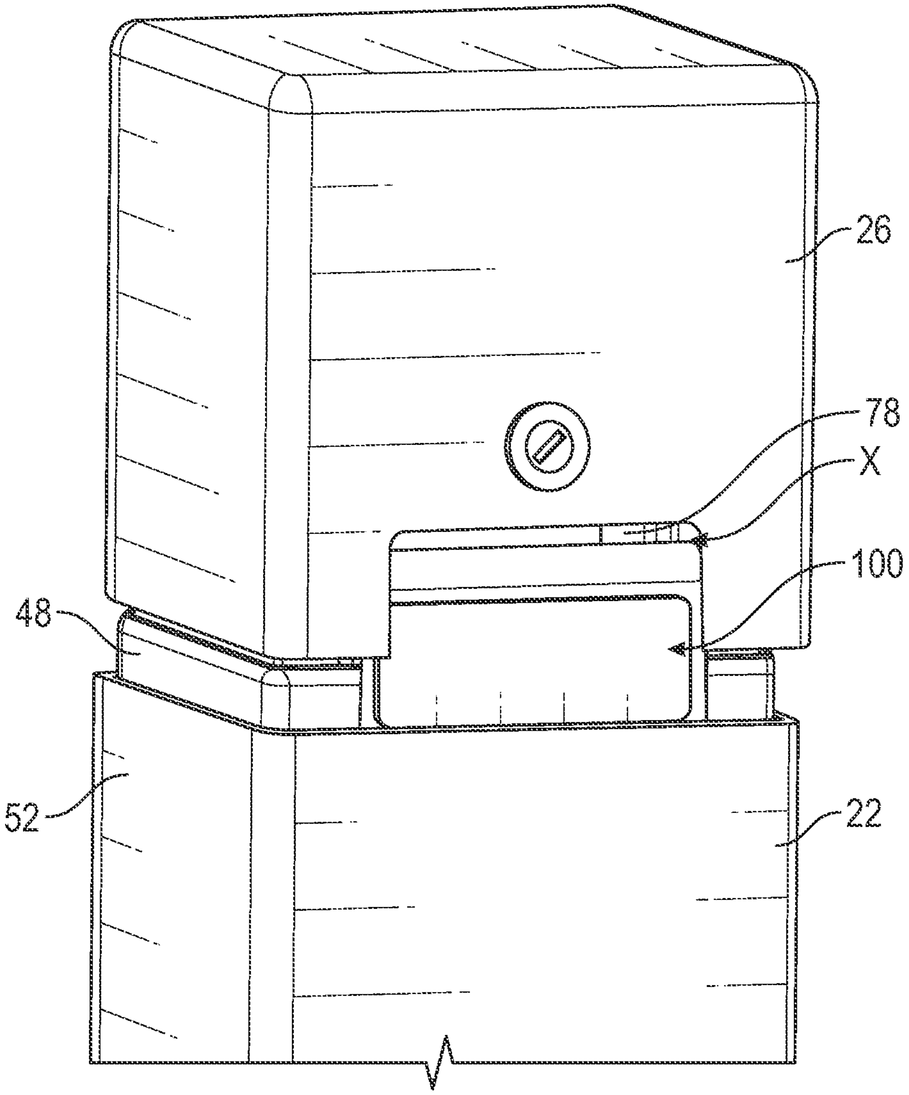
FIG. 4 is a perspective view of the above surface power distribution assembly of FIGS. 1A and 1B with the second housing portion in a second position.
Figure 5:
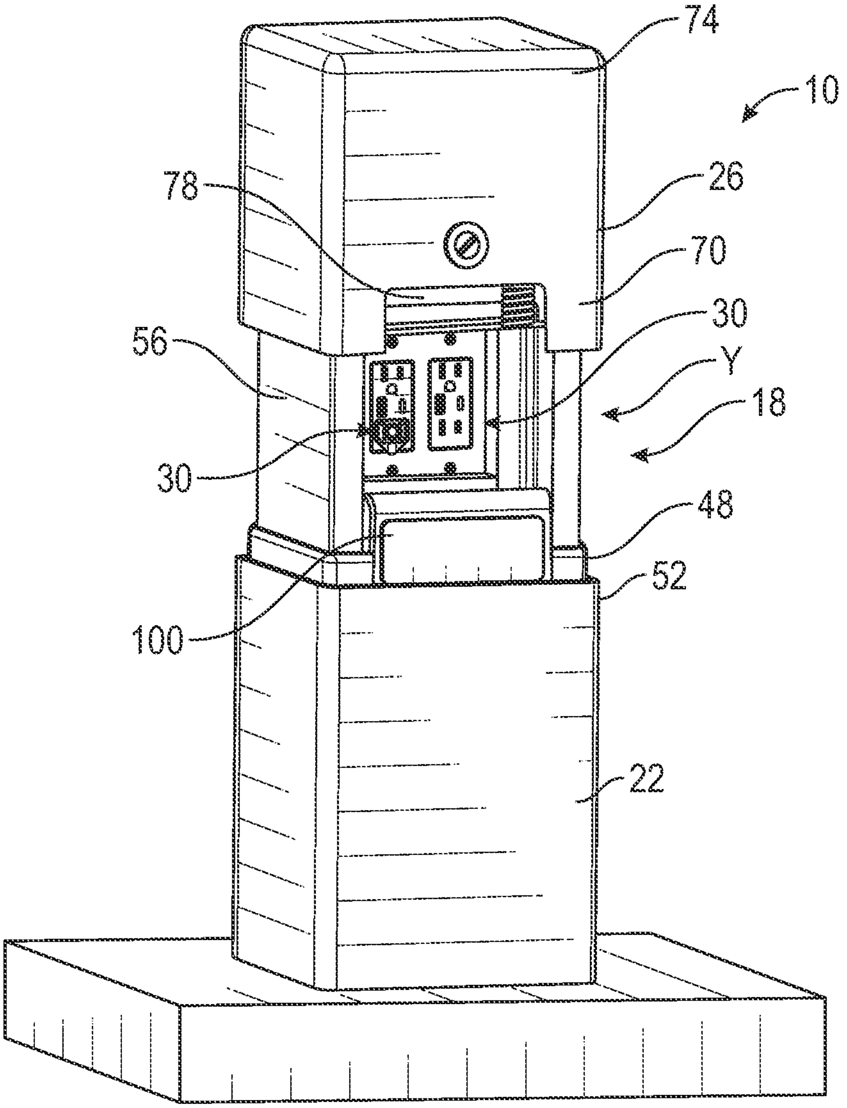
FIG. 5 is a perspective view of the above surface power distribution assembly of FIGS. 1A and 1B with the second housing portion in a third position.
Figure 6:
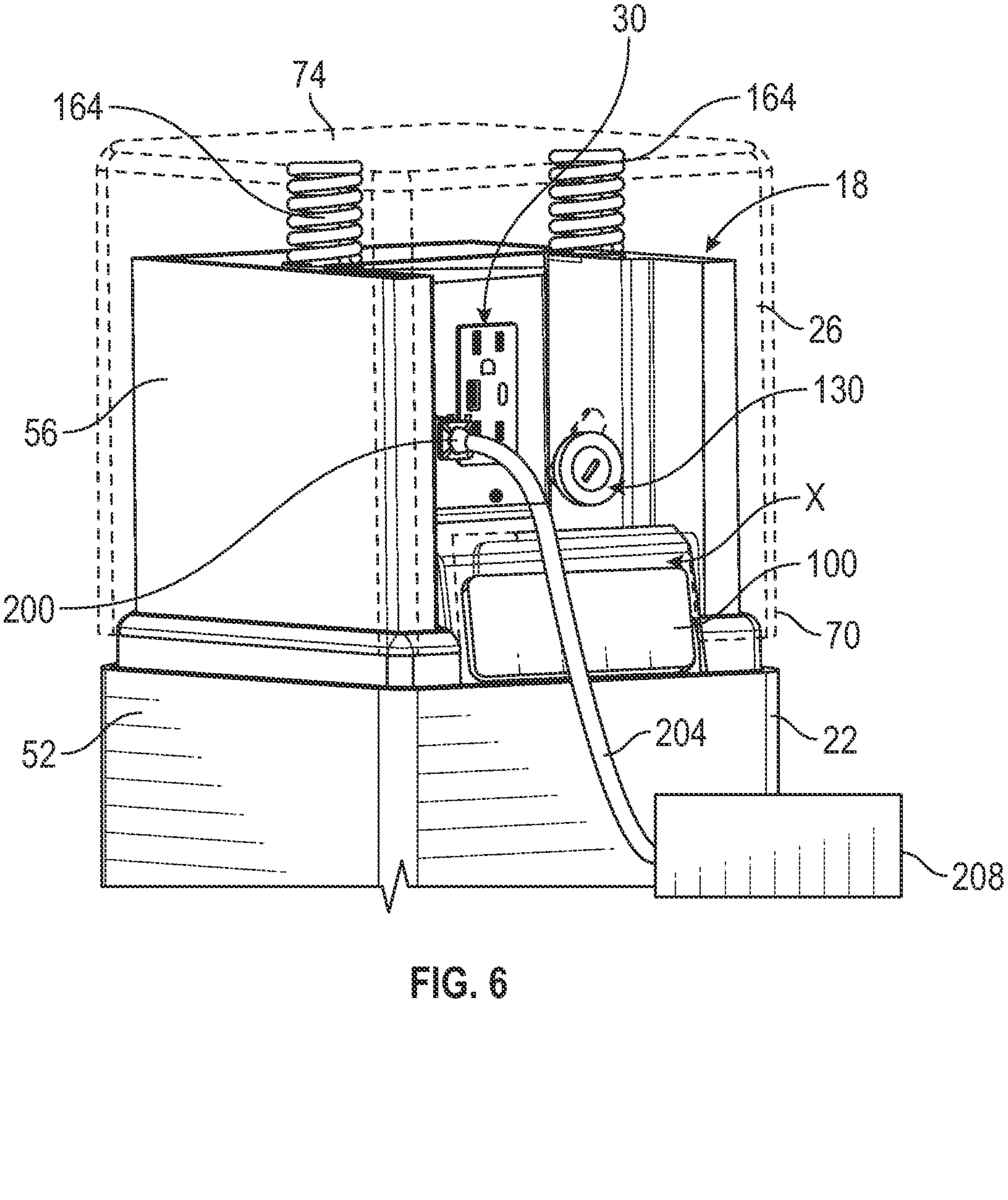
FIG. 6 is another perspective view of the above surface power distribution assembly of FIGS. 1A and 1B with the second housing portion in the second position and accommodating a power cord.
Figure 7:
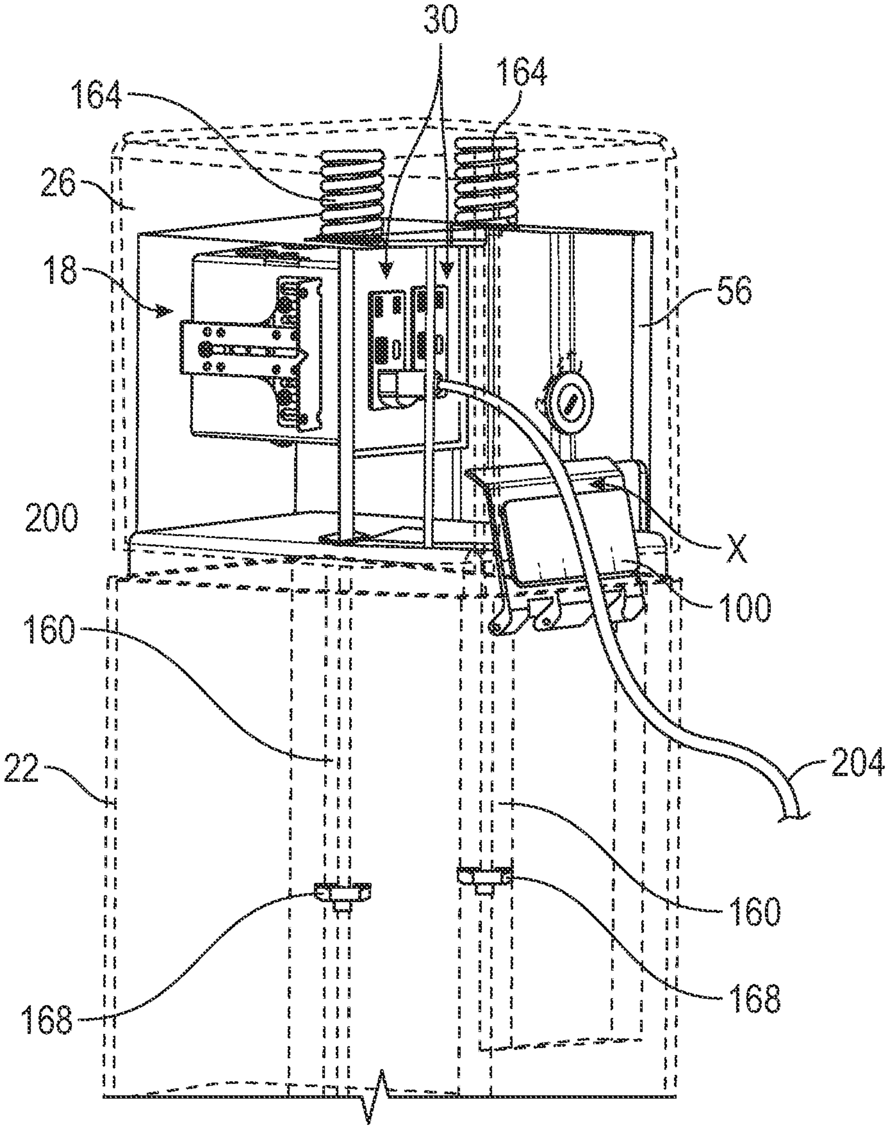
FIG. 7 is another perspective view of the above surface power distribution assembly of FIGS. 1A and 1B with the second housing portion in the second position and accommodated the power cord.

FIGS. 1A-2 illustrate an above surface power distribution assembly 10 including a housing 14 and a power distribution unit 18 supported by the housing. The housing 14 includes a longitudinal axis A, a first housing portion 22, and a second housing portion 26. The first and second housing portions 22, 26 are aligned along the longitudinal axis A. As shown, the power distribution unit 18 is supported by the first housing portion 22 and the second housing portion 26 selectively encloses at least a portion of the power distribution unit 18. The second housing portion 26 is movably coupled to the first housing portion 22 to provide selective access to power outlets 30 (FIGS. 2 and 3) of the power distribution unit 18.

The first housing portion 22 is coupled to and supported by a support surface 40 (e.g., the ground, the floor, a concrete slab, etc.). In particular, the first housing portion 22 includes a first end 44 coupled to the support surface 40 and a second end 48 (FIGS. 2 and 4-8) opposite the first end 44. A lip or flange 52 extends about the perimeter of the first housing portion 22 between the first end 44 and the second end 48. The lip 52 is positioned closer to the second end 48 than the first end 44. The portion of the first housing portion 22 extending from the lip 52 to the second end 48 is narrower than the portion of the first housing portion 22 extending from the first end 44 to the lip 52. That is, the portion of the first housing portion 22 extending from the lip 52 to the second end 48 has a smaller dimension (e.g., width, volume, perimeter, etc.) than the portion of the first housing portion 22 extending from the first end 44 to the lip 52.

As shown in FIGS. 2, 3, and 5-7, in the illustrated embodiments, the power distribution unit 18 includes a first power outlet 30 and a second power outlet 30, which are supported by an electrical housing 56. In the illustrated embodiments, the above surface power distribution assembly 10 includes two power outlets 30, which may have any suitable configuration (e.g., GFCI, three-prong receptacle, two-prong receptacle, USB, USB-C, marine-grade, etc.) and any suitable power rating (e.g., 15 A, 30 A, etc.). In other embodiments, the above surface power distribution assembly 10 may only include a single power outlet 30 or more than two power outlets 30. Additionally, while the illustrated first and second power outlets 30 have the same configuration in the illustrated embodiments, the first and second power outlets 30 may have different configurations in other embodiments. Moreover, in some embodiments, such as those of FIGS. 1B and 2, the above surface power distribution assembly 10 may further include one or more wireless chargers 60 that are accessible to a user from an outside of the housing. In the illustrated embodiment, a wireless charger 60 is supported by the first housing portion 22 and a wireless charger 60 is supported by the second housing portion 26. More specifically, each of the sides of the first housing portion 22 supports a wireless charger 60, and one side (e.g., a top side) of the second housing portion 26 supports a wireless charger 60. Each of the first and second power outlets 30 and the wireless chargers 60 are electrically coupled to an electrical power source (not shown) via electrical connections (e.g., electrical wires, not shown) supported by the first housing portion 22. That is, electrical wires in electrical communication with the power source are fed from underground through the first housing portion 22 to the power distribution unit 18, which provides power to each of the first and second power outlets 30 and the wireless chargers 60. Accordingly, each of the first and second power outlets 30 and the wireless chargers 60 are configured to electrically couple to and provide power to an electrical device.

The second housing portion 26 includes a first end 70 and a second end 74 opposite the first end 70. The first end 70 is an open end that is engages the second end 48 of the first housing portion 22 and the second end 74 is a closed end. The second housing portion 26 is sized and shaped to surround and enclose the electrical housing 30 of the power distribution unit 18. In the illustrated embodiment, the first end 70 of the second housing portion 26 is configured to engage the lip 52 of the first housing portion 22, such that the sides of the second housing portion 26 are flush with the sides of the first housing portion 22. The first end 70 of the second housing portion 26 further includes a recess 78. A first, open end of the recess 78 is positioned at or adjacent the first end 70 of the second housing portion 26 and second, closed end of the recess 78 is spaced apart from the first, open end. A projection 82 is integrally formed with (or otherwise coupled to) an inner surface of the second housing portion 26. The projection 82 extends inwardly (e.g., in a direction towards the longitudinal axis A) from the inner surface. The projection 82 is positioned at or adjacent to the recess 78, and in particular, at or adjacent to the second, closed end of the recess 78.

The housing includes a first coupling mechanism that selectively couples the second housing portion 26 to the first housing portion 22 and a second coupling mechanism that guides movement of the second housing portion 26 relative to the first housing portion 22.

Figure 8:
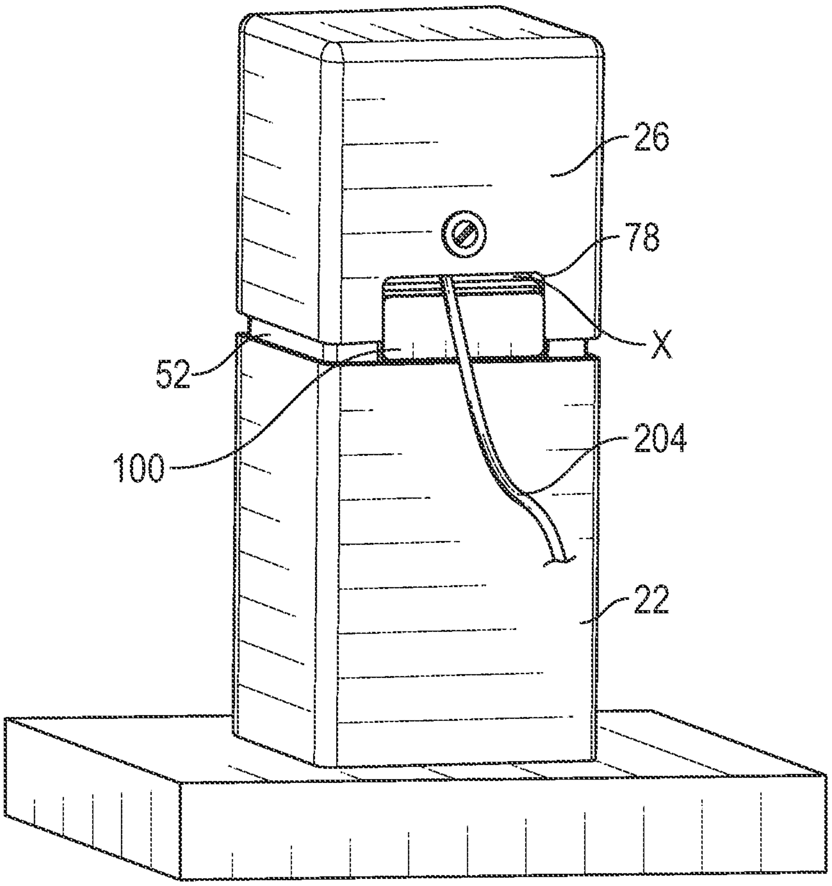
FIG. 8 is another perspective view of the above surface power distribution assembly of FIGS. 1A and 1B with the second housing portion in the second position and accommodated the power cord.
Figure 9:
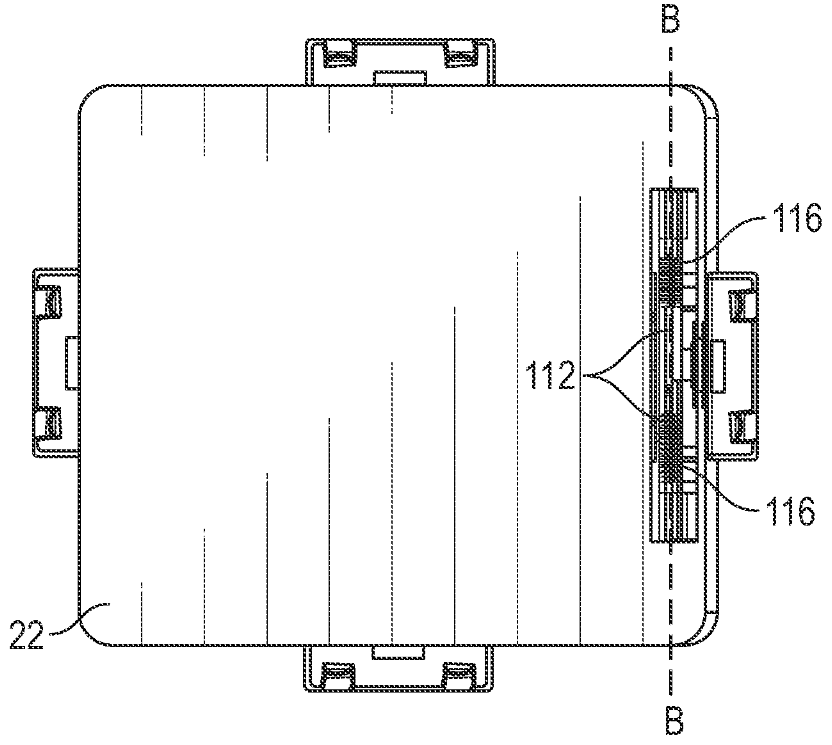
FIG. 9 is a cross-sectional view of the above surface power distribution assembly of FIGS. 1A and 1B along the line 9-9 of FIG. 2.
Figure 10:
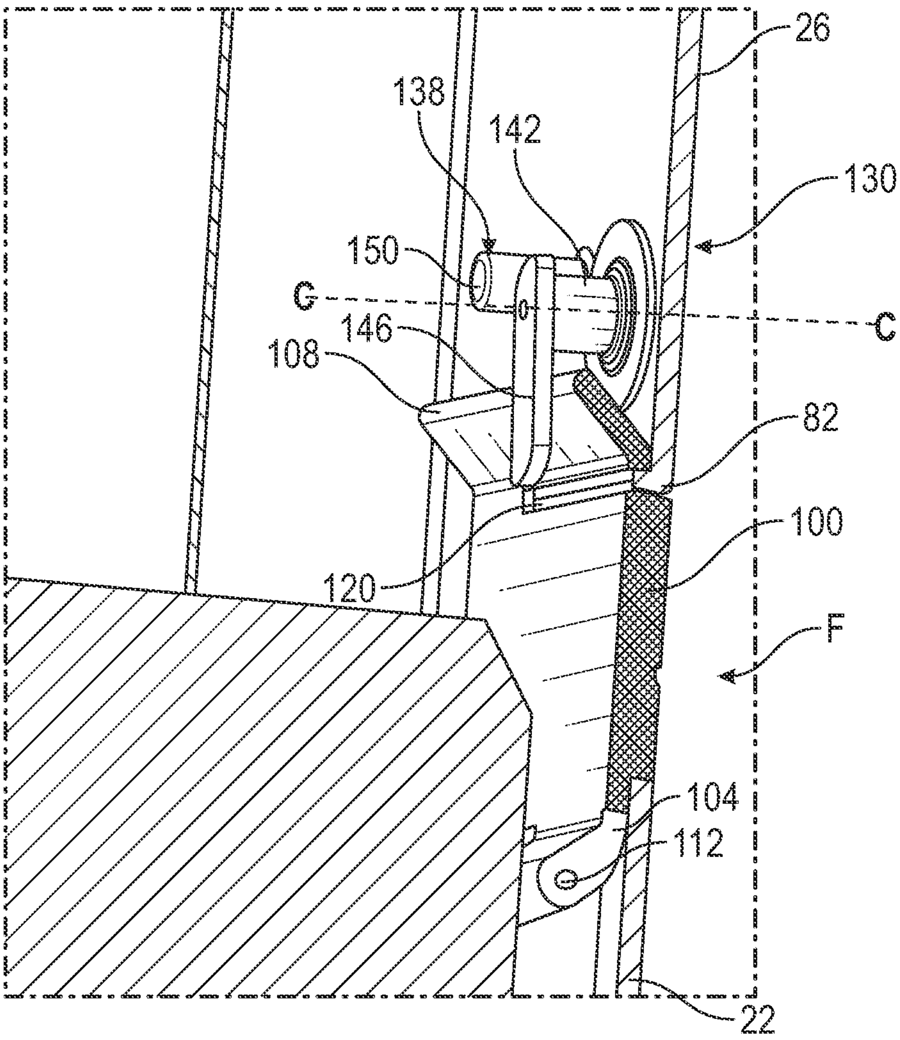
FIG. 10 is a cross-sectional view of the above surface power distribution assembly of FIGS. 1A and 1B along the line 10-10 of FIG. 1A with lock in a first position and the door in a first position.

As shown in FIGS. 8-10, the first coupling mechanism includes a door 100 including a first end 104 coupled to the first housing portion 22 and a second end 108 selectively coupled to the second housing portion 26. In the illustrated embodiment, the first end 100 is pivotably coupled to the first housing portion 22 via a fastener 112 (e.g., a pin). The fastener 112 defines an axis B (FIG. 9) about which the first end 104 is pivotable. In the illustrated embodiment, the axis B is perpendicular to the axis A. At least one biasing member 116 (e.g., a spring, FIG. 9) is supported by the fastener 104. The second end 108 includes an aperture 120 (e.g., an elongate aperture) extending therethrough and configured to receive the projection 82 of the second housing portion 26. The door 100 is movable between an engaged position and a non-engaged position. In the engaged position, the door 100 is positioned within the recess 78 and engages the first end 70 of second housing portion 26. More specifically, the projection 82 of the second housing portion 26 is received in and engages (e.g., via a snap-fit engagement or a friction-fit engagement or the like) the aperture 120 in the second end of the door 100. In the disengaged position, the door 100 is disengaged from the first end 70 of second housing portion 26. That is, the projection 82 of the second housing portion 26 is disengaged from the aperture 120 in the second end 108 of the door 100. The door 100 is biased by the biasing members 116 into the engaged position. A user can move the door 100 from the engaged position to the disengaged position by exerting a force F (FIG. 10) on the door 100 in a direction toward the longitudinal axis A (e.g. generally perpendicular to the longitudinal axis A) and therefore inwardly toward an interior of the second housing portion 26. In some embodiments, the door 100 may include or be surrounded by a light source such that it is back lit thereby indicating the presence of power or for aesthetic reasons.

As shown in the figures, the first housing portion 22 may include a lock 130 that prevents the door 100 from being movable from the engaged position to the disengaged position. In the illustrated embodiment, the lock 130 is a manual lock and includes a key-engaging element 134 that is coupled to a lock element 138. The key-engaging element 134 is accessible from outside of the housing. The lock element 138 extends from the inner surface of the second housing portion 26. In the illustrated embodiment, the key-engaging element 134 is a key-slot configured to receive a key (not shown). Moreover, the lock element 138 is an L-shaped projection that has a first leg 142 and a second leg 146. The first leg 142 extends from the key-engaging element 134 through the second housing portion 26. The second leg 146 extends form the first leg 142. In the illustrated embodiment, the first leg 142 and the second leg 146 are oriented at a non-parallel angle. The angle is about 90 degrees in the illustrated embodiment, although other suitable angles are possible. In other embodiments, the lock 130 may a manual lock having other suitable configurations or may be an electronic lock having any suitable configuration.

Figure 11:
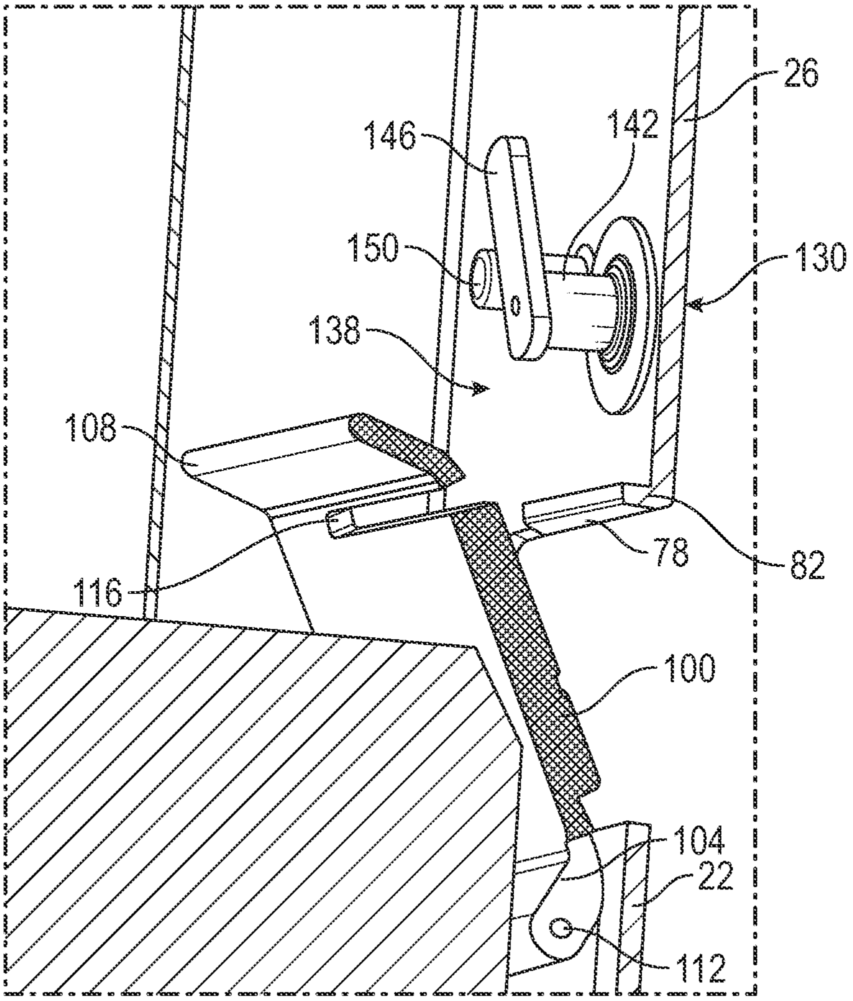
FIG. 11 is a cross-sectional view of the above surface power distribution assembly of FIGS. 1A and 1B along the line 10-10 of FIG. 1A with lock in a second position and the door in a second position.

The lock element 138 is movable (e.g., pivotable or rotatable) between a locked position and an unlocked position. In the illustrated embodiment, the lock element is pivotable about an axis C that is perpendicular to both the axes A, B. In the locked position, as shown in FIG. 10, the second leg 146 is positioned adjacent to (e.g., engaged with) the second end 108 of the door 100 and thereby prevents the door 100 from being movable relative to the second housing portion 26 between the engaged and disengaged position. In the unlocked position, as shown in FIG. 11, the second leg 146 is spaced apart from (or disengaged from) the second end 108 of the door 100 and thereby allows the door 100 to be movable relative to the second housing portion 26 between the engaged and disengaged position. In the unlocked position, the second leg 146 extends from the first leg rests against or is supported by a stop projection 150 extending inwardly from the inner surface of the second housing portion 26 when in the unlocked position. The key moves the lock element 138 between the locked position and the unlocked position.

The second coupling mechanism includes at least one guide member 160 (e.g., guide rod) that are coupled to and extend from the second housing portion 26 toward the first housing portion 22. In the illustrated embodiment, there are two guide rods 160. In the illustrated embodiment, the guide rods 160 are at least partially supported by the electrical housing 30 and each include a first end coupled to the second housing portion 26 and a second end positioned within and movable relative to the second housing portion 26. The first end of each of the guide rods 160 supports a biasing member 164 (e.g., a spring, a piston, a hydraulic cylinder, etc.). In the illustrated embodiment, each of the biasing members 164 is positioned between the electrical housing 30 of the power distribution unit 18 and the second end 74 of the second housing portion 26. The second end of each of the guide rods 160 is positioned within the first housing portion 22 and includes a flange 168, which defines as a stop surface and prevent removal of the second housing portion 26 from the first housing portion 22. The guide rods 160 are movable or slidable with the second housing portion 26 relative to the first housing portion 22.

The second housing portion 26 is movable relative to the first housing portion 22 along the longitudinal axis A between a first, non-use position (see FIGS. 1A-2 and 10) in which the second housing portion 26 is secured (e.g., immovable) relative to the first housing portion 22, and a second, use position (see FIGS. 4, 6-8, and 11) in which the second housing portion 26 is unsecured (e.g., movable) relative to the first housing portion 22. The biasing members 164 positioned within the second housing portion 26 bias the second housing portion 26 into the use position.

In the non-use position, the second housing portion 26 is closed or sealed relative to the first housing portion 22. In particular, the first end 70 of the second housing portion 26 is engaged with the lip 52 of the first housing portion 22 and the door 100 is in the engaged position. The lock 130, when in the locked position, may be used to retain the second housing portion 26 in the non-use position. That is, the lock 130, when in the locked position, may prevent the second housing portion 26 from being movable from the non-use position to the use position. Alternatively, the lock 130, when in the unlocked position, allows the second housing portion 26 to be movable between the non-use and use positions. Accordingly, when not in use (e.g., in the non-use position), the user can seal the housing to keep unwanted insects, debris, and rodents from entering the second housing portion 26 and interfering with the power outlets 30. This configuration overcomes the disadvantages of known “while in use” covers, which are typically open to the environment and allow insects, debris and rodents to contaminate the receptacle area of the outlet(s) which can in turn cause receptacles to develop problems or fail early.

In the use position, the first end 70 of the second housing portion 26 is spaced apart from the lip 52 by a first gap or distance X. When the second housing portion 26 is in the use position, the second housing portion 26 is movable parallel to the longitudinal axis A such that the power outlets 30 are accessible. That is, when the second housing portion 26 is in the use position, the second housing portion 26 is movable to an intermediate position (FIG. 5) in which the power outlets 30 are accessible. In the intermediate position, the first end 70 of the second housing portion 26 is spaced apart from the lip 52 by a second gap or distance Y that is greater than the first distance X.

In use, when it is desired to access the power outlets 30, the second housing portion 26 is in the non-use position, and the lock 130 is in the unlocked position, the user exerts a force F on the door 100 to move the door 100 from the engaged position to the disengaged position. Once the door 100 disengages from the second housing portion 26, the second housing portion 26 automatically (because of the bias of the biasing members 164) moves from the non-use position to the use position thereby creating the first distance X between the first housing portion 22 and the second housing portion 26. The user can then move the second housing portion 26 parallel to and along the longitudinal axis A to the intermediate position to couple a plug 200 of a power cord 204 to one of the power outlets 30. The power outlet 30 may then power a device 208 in electrical communication with the power cord 204. Once the plug 200 is coupled to the power outlet 30, the user can move the second housing portion 26 from the intermediate portion back to the use position. The cord 204 is thus accommodated by the first distance X between the first and second housing portions 22, 26. In some embodiments, the user need only release the second housing portion 26 such that it falls under gravity to the use position. Accordingly, the biasing members 164 can act as a damper to prevent the second housing portion 26 from slamming against the first housing portion 22.

When it is desired to remove the plug 200 and seal the housing, the user can then once again move the second housing portion 26 parallel to and along the longitudinal axis A to the intermediate position to uncouple the plug of the cord to the respective power outlet 30. Once the plug is uncoupled from the power outlet 30, the user can move the second housing portion 26 from the intermediate portion back to the non-use position, overcoming the biasing of the biasing members 164, such that the door 100 re-engages the second housing portion 26. In some embodiments, the user need only release the second housing portion 26 such that it falls under gravity to the non-use position. Again, the biasing members can act as a damper to prevent the second housing portion 26 from slamming against the first housing portion 22. Then the user can move the second housing portion 26 from the use position to the non-use position. Once the second housing portion 26 is in the non-use position, the lock 130 could be moved to the locked position to once again prevent the second housing portion 26 from being movable relative to the first housing portion 22.

Although the present subject matter has been described in detail with reference to certain embodiments, variations and modifications exist within the scope of one or more independent claims of the present subject matter, as described.

What is claimed is:

1. An above surface power distribution assembly for indoors or outdoors usage, the above surface power distribution assembly comprising:

a housing including a first housing portion supported by a support surface and having a door movably coupled to thereto and a second housing portion movably coupled to the first housing portion by the door, the second housing portion movable relative to the first housing portion between a non-use position in which the second housing portion is secured relative to the first housing portion in an immovable position, and a use position in which the second housing portion is unsecured relative to the first housing portion; and a power distribution unit immovably positioned within the housing, the power distribution unit including at least one power outlet in electrical communication with a power source;

wherein when the second housing portion is in the non-use position, the at least one power outlet is inaccessible, wherein when the second housing portion is in the use position, the at least one power outlet is accessible, wherein the door protects the power distribution unit against ingress of solid debris and fluid.

2. The above surface power distribution assembly of claim 1, wherein the second housing portion is biased by a biasing member into the use position.

3. The above surface power distribution assembly of claim 1, wherein the door has a first end that is pivotably coupled to the first housing portion and a second end that is selectively engaged with the second housing portion.

4. The above surface power distribution assembly of claim 3, where the second end of the door is configured to move in a direction toward an interior of the second housing portion to disengage the second end of the door from the second housing portion.

5. The above surface power distribution assembly of claim 1, wherein the housing defines a longitudinal axis, and where the second housing portion is movable parallel to the longitudinal axis between the non-use position and use position.

6. The above surface power distribution assembly of claim 5, wherein the door has a first end that is coupled to the first housing portion and a second end that is selectively engaged with the second housing portion, the door being pivotable about an axis that is perpendicular to the longitudinal axis such that the door moves toward an interior of the second housing portion.

7. An above surface power distribution assembly comprising:

a housing including a first housing portion supported by a support surface and a second housing portion movably coupled to the first housing portion, the second housing portion movable relative to the first housing portion between a non-use position in which the second housing portion is secured relative to the first housing portion, and a use position in which the second housing portion is unsecured relative to the first housing portion;

a door coupled to the first housing portion and selectively coupled to the second housing portion, the door being movable between an engaged position in which the door engages the second housing portion and a disengaged position in which the door is disengaged from the second housing portion; and a power distribution unit positioned within the housing, the power distribution unit including at least one power outlet in electrical communication with a power source;

wherein when the door is in the engaged position, the second housing portion is in the non-use position and the at least one power outlet is inaccessible, wherein when the door is in the disengaged positioned, the second housing portion is in the use position and the at least one power outlet is accessible, wherein when the second housing portion is in the use position, the second housing portion is spaced apart from the first housing portion by a first gap, and wherein the second housing portion is movable from the use position to an intermediate position in which the second housing portion is spaced apart from the second housing portion by a second gap that is bigger than the first gap.

8. The above surface power distribution assembly of claim 7, wherein the second housing portion is biased by a biasing member into the use position when a user moves the door from the engaged to the disengaged position.

9. The above surface power distribution assembly of claim 7, further comprising a lock that prevents the door from being movable to the disengaged position.

10. The above surface power distribution assembly of claim 7, wherein the housing defines a longitudinal axis, and where the second housing portion is movable parallel to the longitudinal axis between the non-use position and use position.

11. The above surface power distribution assembly of claim 10, wherein the door has a first end that is coupled to the first housing portion and a second end that is selectively engaged with the second housing portion, the door being pivotable about a door axis that is perpendicular to the longitudinal axis such that the door moves toward an interior of the second housing portion to move the door from the engaged position to the disengaged position.

12. The above surface power distribution assembly of claim 11, further comprising a lock that prevents the door from being movable to the disengaged position, the lock being pivotable about a lock axis that is perpendicular to both the longitudinal axis and the door axis.

13. An above surface power distribution assembly comprising:

a housing including a first housing portion supported by a support surface and a second housing portion movably coupled to the first housing portion, the second housing portion movable relative to the first housing portion between a non-use position in which the second housing portion is secured relative to the first housing portion in an immovable position, and a use position in which the second housing portion is unsecured relative to the first housing portion; and a power distribution unit immovably positioned within the housing, the power distribution unit including at least one power outlet in electrical communication with a power source;

wherein when the second housing portion is in the non-use position, the at least one power outlet is inaccessible, and wherein when the second housing portion is in the use position, the at least one power outlet is accessible.

14. The above surface power distribution assembly of claim 13, wherein the housing defines a longitudinal axis, and where the second housing portion is movable parallel to the longitudinal axis between the non-use position and the use position.

15. The above surface power distribution assembly of claim 13, further comprising a biasing member positioned between the power distribution unit and the second housing portion to bias the second housing portion into the use position.

16. The above surface power distribution assembly of claim 13, further comprising a guide member that is coupled to the second housing portion and extends into the first housing portion, the guide member configured to guide the second housing portion between the non-use position and the use position.

17. The above surface power distribution assembly of claim 13, further comprising a guide member extending from the second housing portion to the first housing portion through the power distribution unit, the guide member configured to guide the second housing portion between the non-use and the use position.

18. The above surface power distribution assembly of claim 17, wherein the guide member includes a first end positioned between the power distribution unit and the second housing portion and a second end positioned in the first housing portion of the housing, the first end supporting a biasing member that biases the second housing portion into the use position, the second end including a flange that prevents removal of the second housing portion from the first housing portion.

19. The above surface power distribution assembly of claim 13, wherein when the second housing portion is in the use position, the second housing portion is spaced apart from the first housing portion by a first gap, and wherein the second housing portion is movable from the use position to an intermediate position in which the second housing portion is spaced apart from the second housing portion by a second gap that is bigger than the first gap.

* * * * *